United States Patent
Van Wijk

(10) Patent No.: US 10,931,165 B2
(45) Date of Patent: Feb. 23, 2021

(54) VEHICLE COMPRISING A WHEEL DRIVEN GENERATOR FOR CHARGING A BATTERY

(71) Applicant: Carrier Corporation, Palm Beach Gardens, FL (US)

(72) Inventor: Rudolf Johannes Van Wijk, Waddinxveen (NL)

(73) Assignee: CARRIER CORPORATION, Palm Beach Gardens, FL (US)

(*) Notice: Subject to any disclaimer, the term of this patent is extended or adjusted under 35 U.S.C. 154(b) by 113 days.

(21) Appl. No.: 16/308,559

(22) PCT Filed: Jun. 8, 2017

(86) PCT No.: PCT/US2017/036501
§ 371 (c)(1),
(2) Date: Dec. 10, 2018

(87) PCT Pub. No.: WO2017/214363
PCT Pub. Date: Dec. 14, 2017

(65) Prior Publication Data
US 2019/0165649 A1      May 30, 2019

(30) Foreign Application Priority Data
Jun. 10, 2016  (NL) ........................... 2016936

(51) Int. Cl.
*H02K 7/06*   (2006.01)
*H02K 7/116*  (2006.01)
(Continued)

(52) U.S. Cl.
CPC .............. *H02K 7/116* (2013.01); *B60H 1/32* (2013.01); *B60K 17/046* (2013.01); *F16H 57/02* (2013.01);
(Continued)

(58) Field of Classification Search
CPC .......... H02K 7/116; H02K 7/006; H02K 7/08; H02K 7/1846
(Continued)

(56) References Cited

U.S. PATENT DOCUMENTS 6,378,638 B1    4/2002  Mizon et al.
9,950,609 B2 *  4/2018  Takehana ............... H02K 7/116
(Continued)

FOREIGN PATENT DOCUMENTS

CN    101274592 A    10/2008
CN    104085299 A    10/2014
(Continued)

OTHER PUBLICATIONS

International Search Report and Written Opinion for application PCT/US2017/036501, dated Oct. 9, 2017, U301234PCT, 12 pages.
(Continued)

*Primary Examiner* — Thanh Lam
(74) *Attorney, Agent, or Firm* — Cantor Colburn LLP

(57) ABSTRACT

A vehicle having wheels for riding the vehicle over a carrier such as a road or rails, said vehicle having a battery and a generator connected thereto, said generator having a stator and a rotor being arranged to generate electrical power for charging said battery, wherein said wheel drives said rotor by means of a shaft connected to the centre of said wheel and axially extending therefrom, wherein the connection between said rotor and said shaft comprises a gear box for regulating the rotation speed of said rotor relative to the rotation speed of said wheel, characterized in that said gear box comprises a planetary gear train of the type having a sun gear, planet gears and an annular gear, and that said shaft, said sun gear and said rotor extend around a common axis.

11 Claims, 1 Drawing Sheet

(51) Int. Cl.
  *H02K 7/00* (2006.01)
  *B60H 1/32* (2006.01)
  *B60K 17/04* (2006.01)
  *F16H 57/02* (2012.01)
  *H02J 7/14* (2006.01)
  *H02K 7/08* (2006.01)
  *H02K 7/18* (2006.01)

(52) U.S. Cl.
  CPC ................ *H02J 7/14* (2013.01); *H02K 7/006* (2013.01); *H02K 7/08* (2013.01); *H02K 7/1846* (2013.01)

(58) Field of Classification Search
  USPC ........................................................... 310/83
  See application file for complete search history.

(56) References Cited

U.S. PATENT DOCUMENTS

| | | | | |
|---|---|---|---|---|
| 2002/0007974 A1 | 1/2002 | Nagano et al. | | |
| 2008/0289890 A1* | 11/2008 | Stoltzfus | ................ | H02P 9/48 |
| | | | | 180/65.31 |
| 2010/0104927 A1* | 4/2010 | Albright | ............. | H01M 10/615 |
| | | | | 429/50 |
| 2013/0134909 A1 | 5/2013 | Lee | | |
| 2015/0311759 A1* | 10/2015 | Heuser | ................... | H02K 1/165 |
| | | | | 310/195 |

FOREIGN PATENT DOCUMENTS

| | | |
|---|---|---|
| CN | 203967903 U | 11/2014 |
| CN | 104319936 A | 1/2015 |
| CN | 105409100 A | 3/2016 |
| DE | 202013004979 U1 | 9/2014 |
| EP | 0687837 A2 | 12/1995 |
| EP | 1974978 A2 | 10/2008 |
| EP | 2811625 A1 | 12/2014 |
| JP | 2013252844 A * | 12/2013 |
| JP | 2013252844 A | 12/2013 |
| RU | 93051 U1 | 4/2010 |
| WO | 2015194058 A1 | 12/2015 |

OTHER PUBLICATIONS

Chinese Office Action for Application No. 201780035948.2; dated May 19, 2020; 8 Pages.
Russian Office Action for Application No. 201900041; dated Jun. 9, 2020; 6 Pages.

* cited by examiner

VEHICLE COMPRISING A WHEEL DRIVEN GENERATOR FOR CHARGING A BATTERY

SUMMARY

The invention relates to a vehicle having wheels for riding the vehicle over a carrier such as a road or rails, said vehicle having a battery and a generator connected thereto, said generator having a stator and a rotor being arranged to generate electrical power for charging said battery, wherein said wheel drives said rotor by means of a shaft connected to the centre of said wheel and axially extending therefrom, wherein the connection between said rotor and said shaft comprises a gear box for regulating the rotation speed of said rotor relative to the rotation speed of said wheel.

In particular the invention relates to a non-self propelled trailer or railway carriage comprising a refrigerated cargo space. The cargo space has a cooling unit arranged to cool said cargo space to a desired temperature, wherein said cooling unit is powered by the battery. In order to provide power to the battery of the refrigerator device of the cargo space, the rotor of a generator is connected to a wheel of the trailer by means of said wheel shaft and said gear box. Due to the presence of the gear box between the rotor shaft and the wheel shaft the axis of the generator is at a distance from the axes of the wheels.

A problem that may occur is the fact that the generator is not aligned with the wheels causes undesirable torques and vibrations in the mechanical suspension construction, which may lead to failure. The invention aims at a reliable, compact and lightweight solution.

To that end said gear box comprises a planetary gear train of the type having a sun gear, planet gears and an annular gear, and said shaft, said sun gear and said rotor extend around a common axis.

Preferably said annular gear is fixedly connected to said stator, said sun gear is fixedly connected to said rotor, and said planetary gears are each rotatably connected to said shaft. The shaft is preferably furthermore rotatably connected to the rotor by means of at least one bearing.

Said generator preferably is an asynchronous generator or a permanent magnet generator, wherein an AC/DC inverter/charger is connected between said generator and said battery for regulating the current and the voltage of the charging power to said battery, so that they are not dependent on the rotation speed of the wheels. Because the rotor in these types of generators do not need to be powered, less heat is produced.

Said battery is preferably a lithium-ion battery. Said mechanical connection between said generator and said wheel preferably comprises a gear box for regulating the rotation speed of said rotor relative to the rotation speed of said wheel. Said at least one wheel preferably drives said rotor of said generator by means of a shaft connected to the centre of said wheel and axially extending therefrom. In an alternative embodiment said at least one wheel drives said rotor of said generator by means of a hydraulic system. Preferably said vehicle comprises a control unit for selectively arranging said generator to simultaneously be driven by said wheel and generate power for charging said battery if said vehicle is set to decelerate.

BRIEF DESCRIPTION OF DRAWINGS

The invention will further be explained by means of a preferred embodiment, with reference to the figures, wherein.

DETAILED DESCRIPTION

Figure 1:
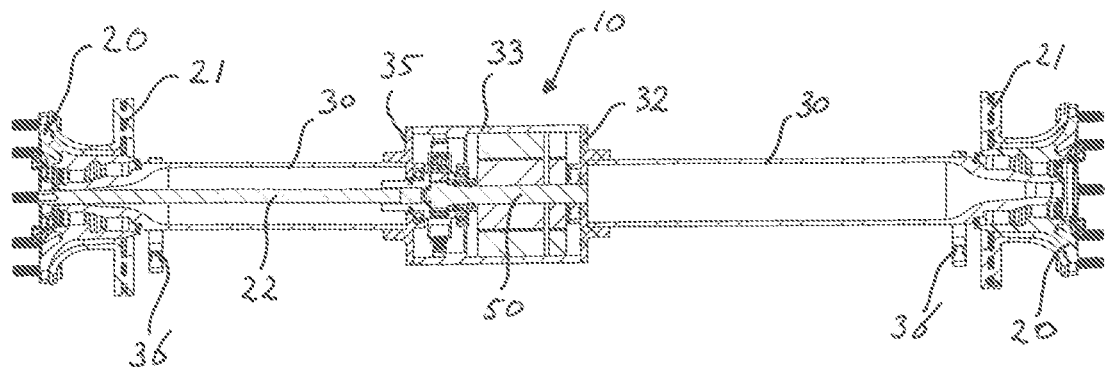
FIG. 1 is a cross sectional view of a wheel, shaft and generator arrangement for a trailer or a railway carriage.
Figure 2:
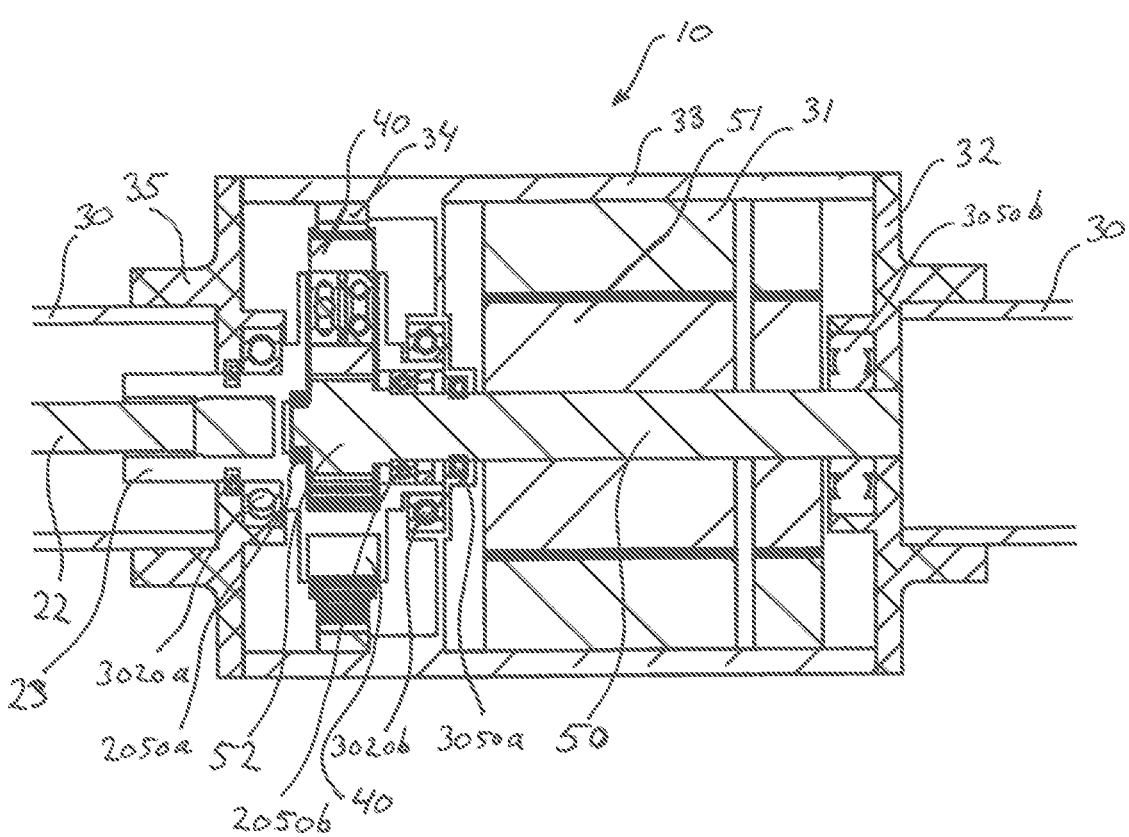
FIG. 2 shows a detail of FIG. 1.

FIGS. 1 and 2 show two respective coaxial wheel attachment flanges 20 and brake disks 21 of a trailer which are rotatably mounted in wheel bearings of the trailer (not shown). A wheel shaft 22 is connected to the left wheel mounted on the flange 20 and extends axially on the axis through the wheels from the centre of the flange 20 towards the area between the wheels. In the area between the wheels, the shaft 22 is connected to the sun gear 52 of a planetary gear train 34, 40, 52, which transfers the rotation of the wheel shaft 22 to the rotor shaft 50 of a generator 31, 50, 51, such that the rotation speed of the rotor shaft 50 is increased compared to the rotation speed of the wheel shaft 22. The electrical output connectors of the generator are connected to an AC/DC inverter/charger for regulating the output current and voltage, which in turn is connected to a lithium-ion battery pack for powering a refrigerating device for cooling a cargo space of the trailer (not shown).

The planetary gear box 34, 40, 52 and the generator are enclosed in a housing 10. The housing 10 is mounted to two stationary cylindrical pipes 30 which are mounted to the trailer by means of brackets 36, and which extend around the axis through the wheels between the wheel bearings and the housing 10. The housing 10 comprises two flanges 32, 35 which are welded to the respective ends of said pipes 30, and a cylindrical wall 33 extending between said flanges 32, 35.

As shown in more detail in FIG. 2, the stator 31 of the generator is mounted against the inner side of the cylindrical wall 33, and the rotor 51 of the generator is mounted on the rotor shaft 50. The rotor shaft 50 is rotatably mounted in the housing 10 by means of cylindrical roller bearing 3050a and ball bearing 3050b. On the left outer end of the rotor shaft the toothed sun gear 52 of the planetary gear train 34, 40, 52 is fixedly mounted. The toothed annular gear 34 is mounted against the inner side of the cilindrical wall 33. Two, three, four, or even more toothed planetary gears 40 are evenly distributed around the sun gear 52 and each rotatably connected to a disc shaped mounting head 23 by means of bearings, which mounting head is fixed on the outer end of the shaft 22.

The mounting head 23 of the shaft 22 is rotatably connected to the housing 10 by means of ball bearings 3020a, 3020b. Furthermore shaft 22 is rotatably connected to the rotor shaft 50 by means of ball bearings 2050a, 2050b.

This construction provides an aligned straight connection between the two wheel bearings, wherein the weight of the construction low and centred on the axis, and which shows a good resistance to axial tensile load.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawing shall be used to interpret the claims. The claims should not be interpreted as meaning that the extent of the protection sought is to be understood as that defined by the strict, literal meaning of the wording used in the claims, the description and drawing being employed only for the purpose of resolving an ambiguity found in the claims. For the purpose of determining the extent of protection sought by the claims, due account shall be taken of any element which is equivalent to an element specified therein.

The invention claimed is:

1. A vehicle having wheels for riding the vehicle over a carrier such as a road or rails, said vehicle having a battery and a generator connected thereto, said generator positioned between a first wheel and a second wheel in a housing, said generator having a stator and a rotor being arranged to generate electrical power for charging said battery, wherein said first wheel drives said rotor by means of a shaft connected to the centre of said first wheel and axially extending therefrom, wherein the connection between said rotor and said shaft comprises a gear box for regulating the rotation speed of said rotor relative to the rotation speed of said first wheel, characterized in that said gear box comprises a planetary gear train of the type having a sun gear, planet gears and an annular gear, and that said shaft, said sun gear and said rotor extend around a common axis.

2. A vehicle in accordance with claim 1, wherein said annular gear is fixedly connected to said stator, said sun gear is fixedly connected to said rotor, and said planetary gears are each rotatably connected to said shaft.

3. A vehicle in accordance with claim 1, wherein the shaft is furthermore rotatably connected to the rotor by means of at least one bearing.

4. A vehicle in accordance with claim 1, wherein said generator is an asynchronous generator or a permanent magnet generator, wherein an AC/DC inverter/charger is connected between said generator and said battery for regulating the current and the voltage of the charging power to said battery.

5. A vehicle in accordance with claim 1, wherein said generator is an asynchronous generator.

6. A vehicle in accordance with claim 1, wherein said generator is a permanent magnet generator.

7. A vehicle in accordance with claim 1, wherein said battery is a lithium-ion battery.

8. A vehicle in accordance with claim 1, wherein said vehicle is a non-self propelled trailer or railway carriage.

9. A vehicle in accordance with claim 1, wherein said vehicle comprises a control unit for selectively arrange said generator to simultaneously be driven by said wheel and generate power for charging said battery if said vehicle is set to decelerate.

10. A vehicle in accordance with claim 1, wherein said vehicle comprises a cargo space with a cooling unit arranged to cool said cargo space to a desired temperature, wherein said cooling unit is powered by said battery.

11. A vehicle in accordance with claim 1, wherein the gear box is enclosed in the housing with the generator, and wherein the housing is mounted to two stationary cylindrical pipes that are mounted to the vehicle by brackets, and wherein the two stationary cylindrical pipes extend around an axis of the first wheel and the second wheel between wheel bearings and the housing.

* * * * *